Aug. 2, 1927.
G. A. RICHTER
1,637,353
METHOD OF MAKING SULPHITE COOKING LIQUOR
Filed Sept. 28, 1921
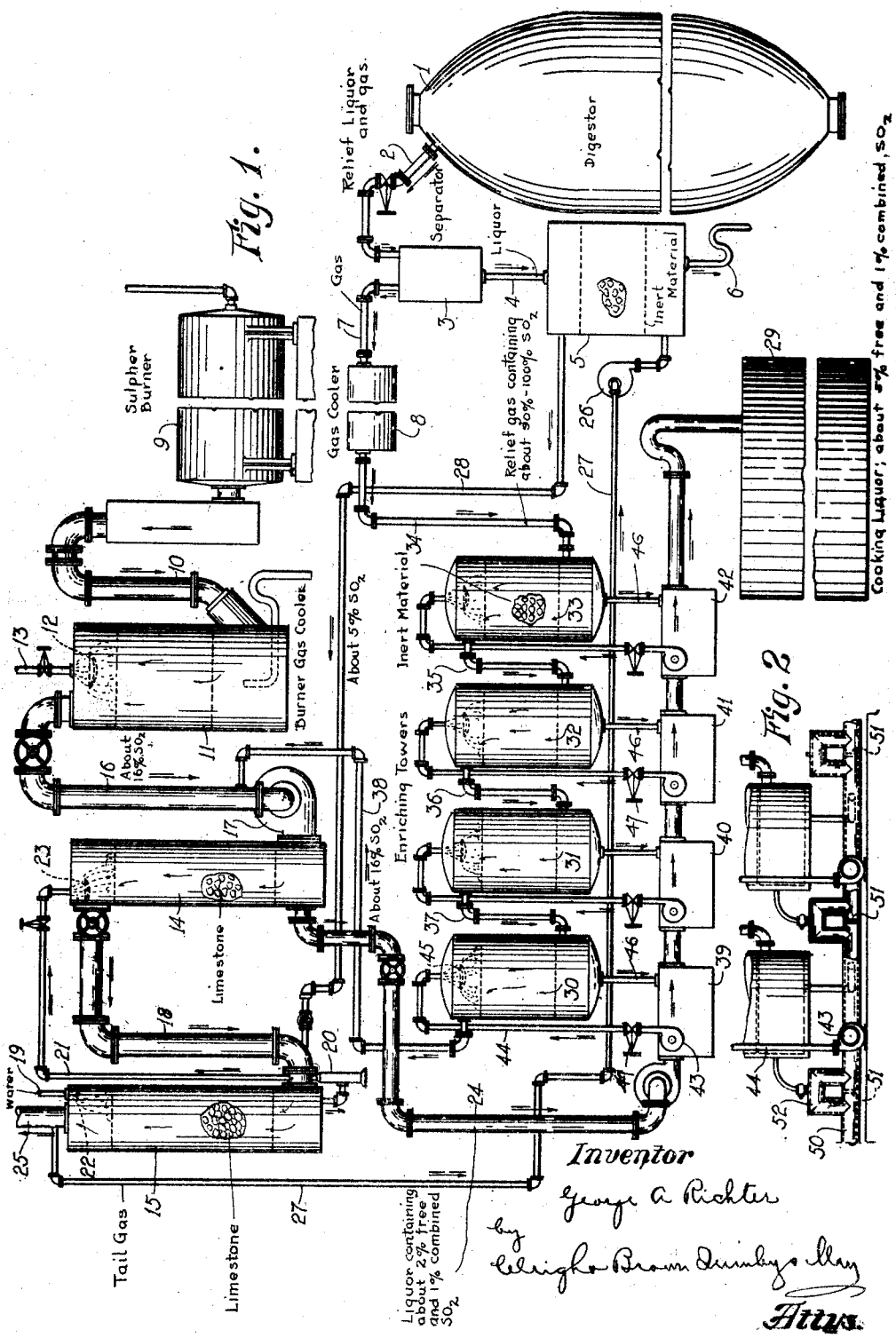

Patented Aug. 2, 1927.

1,637,353

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

METHOD OF MAKING SULPHITE COOKING LIQUOR.

Application filed September 28, 1921. Serial No. 503,846.

This invention relates to the production of a liquor for cooking wood in the manufacture of chemical wood pulp.

Primarily the object of the invention is to provide a process by which there may be produced a calcium or magnesium bisulphite cooking liquor having a uniformly high free sulphur dioxide content and a uniform percentage of combined sulphur dioxide. Other objects of the invention are to minimize the loss of sulphur constituents in the production of the liquor, to provide for the enrichment of the liquor with free sulphur dioxide or sulphurous acid, and to utilize the relief gases in the formation of such liquor.

In carrying out my invention, I first produce what I term a "raw acid liquor" such as may be prepared by causing sulphur burner gases and water to flow in counter-current direction through absorption towers containing limestone or other base material. Such a raw liquor has a relatively low free sulphur dioxide content, and, according to my process, this is enriched by causing it to circulate in contact with a substantially pure or rich gas, until the free sulphur dioxide content is raised to the required proportion, to produce what may be termed a "finished acid liquor". To accomplish this result, rich or substantially pure gas is caused to flow in one direction through a series of towers containing a suitable inert interstitial or surface material, and the raw acid liquor is circulated through said towers in the opposite direction to the flow of the gas, the liquor being circulated rapidly several times through each tower before it reaches the next tower in the series. The "enriching gas" is preferably the relief gas which is discharged from the digesters during the process of digestion. One of the advantages incident to the use of such relief gases is that they are practically pure $SO_2$ so that they may be employed with the greatest benefit in enriching the raw acid liquor.

Ordinarily, in the operation of a pulp mill, wherein the wood chips are digested by calcium or magnesium bisulphite, the delivery of the relief gases from the digesters is uneven. In the cooking of the chips, the relief gases are delivered intermittently in large volumes, and yet there may be relatively long periods in which a relatively small amount of relief gases is permitted to escape. In a system such as I have herein referred to, wherein the relief gases are utilized in the enrichment of the raw acid liquor, such gases may be carried through a series of towers, and, by causing a rapid circulation of the acid liquor through each of the series of towers, it is possible to utilize a large volume of relief gases as it may be delivered intermittently from the digesters. Furthermore, it is possible in such case to employ relatively small towers and secure an even distribution by causing a rapid circulation of the liquor in counter-current flow to the enriching gas. According to this method, although the main body of the acid liquor may be flowing in an opposite direction to the flow of the main body of enriching gas from the relief system of the digesters, nevertheless, during their flow, the liquor may be caused at various points to be circulated in counter-current flow to the gas in the various towers through which the gas flows in series, but through which liquor is caused to be circulated in multiple, as it were.

It is quite evident that the number of these towers utilized in enriching the raw acid liquor may be varied as desired, but in general it may be said that the greater the number of such towers, the greater will be the enrichment of the acid liquor with free sulphur dioxide due to the fact that counter-current principles are most closely approximated.

On the accompanying drawings,—

Figure 1 illustrates more or less conventionally and diagrammatically an apparatus or system for carrying out my process.

Figure 2 illustrates in detail the main pipe for the raw acid liquor and the connections between such pipe and some of the enriching towers.

On this drawing,—1 indicates a digester of the usual type employed in the manufacture of sulphite pulp so-called. This digester is provided with the usual relief pipe 2, through which the relief liquor and gases may be relieved from time to time as ordinarily. This pipe leads to the usual separator 3 wherein the hot relief gas is separated from the liquor, the latter passing downwardly through a pipe 4 to a tower 5 in which the relief liquor is freed of its residual gases by any suitable means, as, for instance, by tail gas from the absorption towers or by exhaust steam. This tower 5 is provided with inert interstitial material, such as spiral brick or the like, so that the liquor flowing downwardly therethrough may be met by tail gas or steam flowing in the opposite direction and the free $SO_2$, which has not been liberated in separator 3, removed from such liquor. From this tower 5, the liquor, which has now been substantially freed of its remaining gas (approximately 75% to 85% having been liberated in apparatus 3), is delivered through a waste pipe 6. The hot relief gases, consisting of from 90% to 100% $SO_2$, are delivered from the separator by a pipe 7. It is desirable to cool these gases before attempt is made to utilize them in the enrichment of the raw acid liquor, and consequently I have shown conventionally at 8 an indirect cooler by which these gases are cooled preferably to a temperature of approximately 90° F. or below. The separator and the cooler may be of the ordinary construction. At 9 I have indicated conventionally a burner for the combustion of sulphur or sulphur-bearing material for the production of $SO_2$. The gases delivered from this burner are conducted by a pipe or conduit 10 to a cooler indicated as a whole at 11. Any suitable cooler may be utilized for the purpose, but I have indicated conventionally a tower which may be provided with a mass of inert interstitial material upon which water at seasonable temperatures is sprayed from a nozzle 12 at the end of a supply pipe 13. As the gas passes upwardly in counter-current flow to the water, it is cooled and is ready for delivery to the absorption towers. For the purpose of cooling the burner gases, I may utilize the cooling system illustrated in Patent No. 1,469,959, granted to Gordon E. Wightman and myself on October 9, 1923. The gases delivered from the cooler consist of approximately 16% $SO_2$ in admixture with nitrogen and a small percentage of oxygen and traces of other gases. At 14 and 15 I have indicated conventionally two of the usual absorption towers employed in the production of the raw acid liquor, such towers containing limestone, dolomite or other calcium or magnesium bearing materials. The gas from the cooler 11 is delivered to the lower end of tower 14 through a conduit 16 by means of a pump 17, and passing upwardly therethrough is conducted by a conduit 18 to the lower end of tower 15. Water is delivered to the top of tower 15 by supply pipe 19, and the liquor from the base of said tower is forced by a pump 20 through pipe 21 to the top of tower 14. The delivery pipe 19 and the delivery end of pipe 21 are supplied with usual spray nozzles as indicated at 22 and 23. The bisulphite liquor, which I have termed the raw acid liquor, is conducted from the lower end of tower 14 by a conduit 24. This liquor contains ordinarily about 2% free $SO_2$ and 1% combined $SO_2$. The tail gas from tower 15 emerges through the pipe 25, and a portion of this gas, which contains little or no $SO_2$, is forced by a pump 26 through pipe 27 to the lower end of the tower 5 for the purpose of sweeping from the relief liquor any free $SO_2$ which may be therein. As previously stated, in lieu of using the tail gas from the absorption tower for removing the residual gas in the relief liquor, other means may be utilized for the same purpose. As shown, a conduit 28 conducts the gases from the upper end of the scavenging tower 5 to the delivery end of the conduit 18, such gas containing approximately 5% $SO_2$. This scavenging tower is ordinarily at or below atmospheric pressure, thereby permitting a certain definite removal of sulphur dioxide from the relief liquor such as ordinarily cannot be removed from the separator 3, due to the fact that this separator is ordinarily under a definite pressure varying from 1 to 20 pounds depending upon the resistance encountered in passing the relief gas through the enriching towers to be described.

The raw acid liquor, on its way to a storage tank indicated at 29 through the conduit 24, is caused to absorb $SO_2$ until it contains a definite or predetermined high content of free $SO_2$. For this purpose, as previously stated, I employ the relief gas from the cooler 8 as it contains approximately 90% to 100% $SO_2$. This is accomplished by providing a series of enriching towers 30, 31, 32, 33, the number of which may be varied as desired. Each of these towers is provided with a mass of inert interstitial material such, for example, as spiral brick, and they are so connected that relief gas will pass through them successively. For this purpose, a pipe 34, leading from the gas cooler 8, delivers such gas to the lower end of the tower 33. The upper end of tower 33 is connected to the lower end of tower 32 by a gas conduit 35, and similarly the tower 32 is connected to the tower 31 and the tower 31 to the tower 30 by similar pipes 36, 37. From the upper end of tower 30, a pipe 38 conducts the tail gas, which contains approximately 16% $SO_2$, to the conduit 16 where it is intermixed with the burner gases containing approximately a like amount of $SO_2$. Below each of the towers, there is a small tank associated therewith, these tanks being indicated at 39, 40, 41 and 42. They are introduced between sections of the conduit 24 for the raw acid liquor so that pools of such liquor may be formed and retained therein, the liquor flowing slowly from one tank to another until it is finally delivered to the storage tank 29 from which it may be drawn for use in the digesters.

Associated with each enriching tower and the tank therebelow are provisions for causing a rapid circulation of the acid liquor through the tower in counter-current flow to the gas passing therethrough. Each such circulating system is indicated conventionally as comprising a pump 43 and a pipe 44 through which the acid liquor is pumped to a spray nozzle 45 at the upper end of the tower, so that it may pass downwardly through the tower over the surfaces of the inert material and be brought into contact with the upwardly flowing streams of gas. From the lower end of the tower, the liquor is delivered by a pipe 46 to the tank. Thus it will be seen that, as the liquor flows slowly through the tanks 39 to 42 in series, which may be so located that this takes place by the action of gravity, the liquor may be circulated several times through each of the towers into contact with the gas therein. Hence, although the gas and the liquor pass in opposite directions through the series of towers, nevertheless the liquor may be circulated from the pool below each tower several times through the tower. As it passes through the towers, the acid liquor is increasingly enriched with $SO_2$, so that, by the time it reaches the storage tank 29, it contains approximately 5% free $SO_2$, and 1% combined $SO_2$. The relief gas, in flowing in the opposite direction through the series of towers 33 to 30 inclusive, is gradually deprived of $SO_2$, so that the tail gas, delivered through the pipe 38, comprises approximately or a little greater percentage of $SO_2$ than is contained in the sulphur burner gases.

Instead of providing tanks as conventionally indicated at 39 to 42, the conduit 24 may be so formed as to provide pools of acid liquor. In Figure 2, for example, I have indicated a large conduit which may be approximately 12 inches in diameter and which is indicated at 50. This conduit is provided with transverse partitions 51, dividing it so that there is a section associated with each of the enriching towers. An overflow seal 52 connects each pair of adjacent sections, so that the liquor must pass through it before it is picked up by the pump 43 which circulates it through the associated tower. In this case, there is likewise provided means for the reception and temporary retention of a pool of liquor from which the liquor may be circulated several times through the tower associated therewith. When there is a small amount of liquor passing through the system, as when a relatively small amount of the raw acid liquor is being made, each gallon of liquor may pass through each tower several times before being delivered to the next tower in series. This affords repeated opportunity for the absorption of gas by the liquor in each tower, the limit of absorption being represented by the saturation of the liquor under a given condition. Inasmuch as each tower in the series is a complete unit, it allows complete absorption under conditions which approximate quite closely a true counter-current absorption and ensures a high free sulphur dioxide content in the liquor leaving the towers. On the other hand, it is possible to treat a large volume of liquor with great rapidity inasmuch as it is re-circulated several times before leaving any one of the towers.

Due to the rapid circulation of the liquor through each of the enriching towers, there is effected a very efficient distribution of liquor over the inert surface material contained in the tower. Such an efficient distribution cannot be obtained with a small volume of liquor passing through the towers without such rapid circulation. It is evident that the more perfect this distribution, the more complete will be the absorption of $SO_2$ from the relief gas.

It is a well known fact that the rate of absorption of a soluble gas in a solvent increases rapidly when the velocity of the gas and of the absorbing liquor over a given area of surface material is increased. Hence, by increasing the volume of liquor passing through each tower in a given period of time, the efficiency of the tower and of its surface material is increased. This is accomplished without sacrificing the benefits derived from a counter-current system.

Inasmuch as each enriching tower has an independent connection with the main conduit 24, a temporary shut-down of any tower (due to accident or otherwise) will not interfere with the normal operation of the remaining portion of the system, for, if one tower is incapacitated, the liquor (which would normally flow through such tower) will merely pass to the next succeeding unit.

In the normal operation of a digester plant, the relief gas discharged from the digesters fluctuates considerably. At times there is a large volume of relief gas, whereas, at other times, the relief gas is small in volume or may even be cut off altogether. The system herein described is so arranged that fluctuations of gas flow will not interfere with efficient absorption of gas at all times, this being due to the large volume of liquor which is present in the system at any given time. That is, by providing the series of supply pools of acid liquor through which the liquor flows slowly, a given time period for any given volume of liquor to pass through the system may be established. This flow of liquor may be regulated according to the working conditions of the particular mill in which it is installed, taking into account the number of digesters which may be connected to the same relief system. In some cases, it is desirable to provide means for varying the speed of the circulating pumps for the several enriching towers. This may be accomplished in various ways, as by providing enough variable-speed motors for the pumps 43, or the same result may be accomplished by throttling valves 47 located in the pipes 44.

Inasmuch as the entire system is illustrated only conventionally and more or less diagrammatically, I have not attempted to show all of the various valves, couplings, pumps, recording gages, etc., with which such a system is normally equipped, but it will be understood, of course, that all of such usual instrumentalities will be employed as may be needed; nor have I attempted to indicate the various levels at which the various instrumentalities may be located nor the relative sizes of the various instrumentalities. It may be pointed out, however, that the enriching towers may be relatively small in size, say 10 feet in length and 6 feet in diameter.

It is quite evident that various changes may be made in the system as conventionally illustrated and herein described, and that various changes may be made in the process without departing from the spirit and scope of the invention as defined in the claims.

What I claim is:—

1. A process of making a sulphite cooking liquor of high free $SO_2$ content, which comprises forming a raw acid liquor of relatively low free $SO_2$ content, passing gas rich in $SO_2$ upwardly through a series of masses of confined inert interstitial material, maintaining a supply pool of said liquor associated with each of said confined masses, simultaneously circulating said liquor from said pools downwardly through said confined masses of inert material associated therewith, and causing the liquor to flow progressively through the pools in opposite direction to the flow of the gas and at a rate ensuring the recirculation of the liquor from each pool through the corresponding tower, whereby such liquor is progressively increased in free $SO_2$ content.

2. A process of making a sulphite cooking liquor of high free $SO_2$ content, which comprises forming a raw acid liquor of relatively low free $SO_2$ content, passing a gas rich in $SO_2$ successively through inert interstitial material in each of a series of towers, simultaneously passing the raw acid liquor through each of the towers in an opposite direction and in counterflow to said gas, maintaining a pool of liquor for each of said towers, from which the liquor is circulated to and back from said towers, and producing a flow of liquor from pool to pool in opposite direction to the flow of gas, whereby such liquor is progressively enriched with $SO_2$.

3. A process of making a sulphite cooking liquor of high free $SO_2$ content, which comprises conducting sulphur burner gases through a series of limestone-containing towers and conducting water in the opposite direction through said towers to form a raw acid liquor having a relatively low free $SO_2$ content, passing the raw acid liquor simultaneously through the towers of a series of towers, having inert surface material, simultaneously therewith passing digester relief gas through the series towers in an opposite direction and in counterflow to said liquor therein, maintaining a supply pool of liquor for each of said towers from which pools the liquor is circulated through the associated towers and back to said pools, and producing a flow of liquor from supply pool to supply pool in an opposite direction to the flow of gas, whereby such liquor is progressively enriched with free $SO_2$; and mixing the tail gas from said last-mentioned series of towers with said burner gas, for the formation of the liquor low in free $SO_2$.

4. A process of making a cooking liquor of high free $SO_2$ content, which comprises conducting sulphur burner gases through a series of limestone-containing towers and conducting water in the opposite direction through said towers to form a raw acid liquor having a relatively low free $SO_2$ content, separating from the relief liquor the gas relieved during the digestion of sulphite pulp, passing such relief gas through a series of enriching towers in contact with inert surface material, maintaining a supply pool of liquor for each of said towers, producing a flow of liquor from pool to pool in opposite direction to the flow of gas, and circulating the liquor from each pool through the associated tower in countercurrent flow to the gas therein, whereby such liquor is progressively enriched with free $SO_2$, recovering $SO_2$ from said relief liquor, and mixing such recovered $SO_2$ with the gases passed through said limestone containing towers at a point where the strength of the $SO_2$ in such gases is not decreased thereby.

In testimony whereof I have affixed my signature.

GEORGE A. RICHTER.